United States Patent
Mamadapur et al.

(10) Patent No.: US 12,316,617 B2
(45) Date of Patent: May 27, 2025

(54) SYSTEM FOR CLOUD COMPUTING SECURITY USING A QUANTUM ENCRYPTION ALGORITHM

(71) Applicant: BANK OF AMERICA CORPORATION, Charlotte, NC (US)

(72) Inventors: Krishna Rangarao Mamadapur, Pune (IN); Jigesh Rajendra Safary, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 250 days.

(21) Appl. No.: 18/073,777

(22) Filed: Dec. 2, 2022

(65) Prior Publication Data

US 2024/0187389 A1    Jun. 6, 2024

(51) Int. Cl.
*H04L 9/40* (2022.01)

(52) U.S. Cl.
CPC ................ *H04L 63/0435* (2013.01)

(58) Field of Classification Search
CPC .................................................. H04L 63/0435
See application file for complete search history.

(56) References Cited

U.S. PATENT DOCUMENTS

| | | | |
|---|---|---|---|
| 9,774,401 B1* | 9/2017 | Borrill | ............ H04L 9/0852 |
| 10,172,000 B2 | 1/2019 | Link, II | |
| 10,305,688 B2 | 5/2019 | Fu et al. | |
| 10,708,046 B1 | 7/2020 | Ashrafi | |
| 10,831,935 B2 | 11/2020 | Vijayasankar et al. | |
| 10,855,452 B2 | 12/2020 | Fu | |
| 10,929,031 B2 | 2/2021 | Sapuntzakis et al. | |
| 11,108,550 B1 | 8/2021 | Esbensen et al. | |
| 11,223,470 B1 | 1/2022 | Shea et al. | |
| 11,301,547 B1* | 4/2022 | Malassenet | ............ H04L 9/002 |
| 11,341,254 B2 | 5/2022 | Esbensen et al. | |
| 11,341,503 B2 | 5/2022 | Concannon et al. | |
| 11,343,084 B2 | 5/2022 | Nix | |
| 11,366,897 B1 | 6/2022 | Ramanathan et al. | |
| 11,496,298 B2 | 11/2022 | Henderson et al. | |
| 11,514,352 B2 | 11/2022 | Ashrafi | |
| 2018/0351734 A1 | 12/2018 | Zhao et al. | |
| 2019/0327086 A1 | 10/2019 | Slowik | |
| 2020/0014668 A1 | 1/2020 | Statica et al. | |
| 2021/0014939 A1 | 1/2021 | Verzun et al. | |
| 2021/0044432 A1* | 2/2021 | Li | ............ H04L 9/0852 |

(Continued)

*Primary Examiner* — Kristie D Shingles
(74) *Attorney, Agent, or Firm* — Moore & Van Allen PLLC; Nicholas C. Russell

(57) ABSTRACT

A system is provided for cloud computing security using a quantum encryption algorithm. In particular, the system may comprise a quantum computing system that receives target data that has been encrypted using a first encryption algorithm. The quantum computing system may encrypt the target data using a second encryption algorithm, which may include a quantum encryption algorithm. Once the target data has been encrypted using the second encryption algorithm, the target data may be stored on a cloud server. Upon receiving a request for the target data, the quantum computing system may perform a decryption of the encrypted target data through the second encryption algorithm such that the target data may then be decrypted using the first encryption algorithm before being served to the requesting endpoint device.

14 Claims, 9 Drawing Sheets

(56) References Cited

U.S. PATENT DOCUMENTS

| | | | |
|---|---|---|---|
| 2021/0083865 A1* | 3/2021 | Obadia | H04L 9/0852 |
| 2021/0306145 A1 | 9/2021 | Krauthamer et al. | |
| 2022/0131690 A1 | 4/2022 | Toudeh-Fallah et al. | |
| 2023/0027422 A1* | 1/2023 | Hines, III | H04L 9/0662 |

* cited by examiner

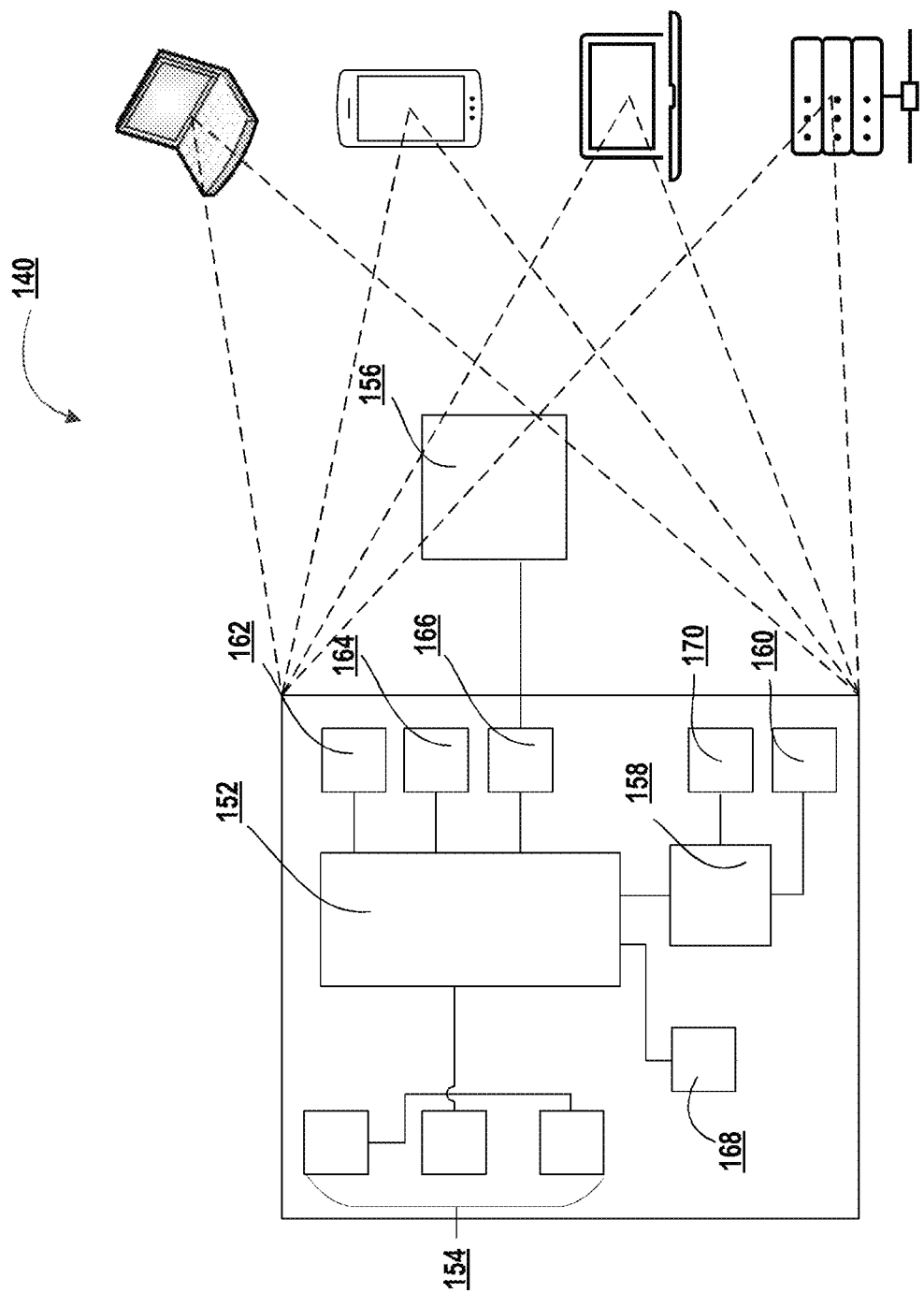

SYSTEM FOR CLOUD COMPUTING SECURITY USING A QUANTUM ENCRYPTION ALGORITHM

FIELD OF THE INVENTION

The present invention embraces a system for cloud computing security using a quantum encryption algorithm.

BACKGROUND

There is a need for a secure and efficient way to store and manage electronic data within a networked computing environment.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for cloud computing security using a quantum encryption algorithm. In particular, the system may comprise a quantum computing system that receives target data that has been encrypted using a first encryption algorithm. The quantum computing system may encrypt the target data using a second encryption algorithm, which may include a quantum encryption algorithm. Once the target data has been encrypted using the second encryption algorithm, the target data may be stored on a cloud server. The system may further comprise an intelligent cloud data orchestrator which may manage the encryption and/or decryption of data stored on cloud servers as well as requests from endpoint devices for the target data stored on the cloud servers. Upon receiving a request for the target data, the quantum computing system may perform a decryption of the encrypted target data through the second encryption algorithm such that the target data may then be decrypted using the first encryption algorithm before being served to the requesting endpoint device. In this way, the system provides a secure, high-speed way to store and serve data in a cloud computing environment.

Accordingly, embodiments of the present disclosure provide system for cloud computing security using a quantum encryption algorithm, the system comprising at least one non-transitory storage device; and at least one processor coupled to the at least one non-transitory storage device, wherein the at least one processor is configured to receive target data from an endpoint device; encrypt the target data using a first encryption algorithm, wherein the first encryption algorithm uses a classical computing process; transmit the target data to a quantum computing system; trigger the quantum computing system to encrypt the target data using a second encryption algorithm, wherein the second encryption algorithm uses a quantum computing process; and transfer the target data to one or more cloud computing hosts.

In some embodiments, the at least one processor is further configured to receive the target data from the one or more cloud computing hosts; trigger the quantum computing system to decrypt the target data using the second encryption algorithm; receive the target data from the quantum computing system; decrypt the target data using the first encryption algorithm; and transmit the target data to one or more requesting endpoint devices.

In some embodiments, transferring the target data to the one or more cloud computing hosts comprises monitoring a status of the one or more cloud computing hosts, wherein the status comprises computing resource consumption, process execution, and machine performance of the one or more cloud computing hosts; and based on characteristics of the target data and the status of the one or more cloud computing hosts, selecting a first cloud computing host among the one or more cloud computing hosts for storing the target data.

In some embodiments, transferring the target data to the one or more computing hosts further comprises detecting that the first cloud computing host is overloaded; retrieve a copy of the target data from one or more registries; trigger the quantum computing system to encrypt the copy of the target data using the second encryption algorithm; and transmit the copy of the target data to a second cloud computing host among the one or more cloud computing hosts.

In some embodiments, the at least one processor is further configured to automatically restart the first cloud computing host in response to detecting that the first cloud computing host is overloaded.

In some embodiments, the first encryption algorithm is a data encryption standard ("DES") algorithm.

In some embodiments, the second encryption algorithm is a quantum key distribution ("QKD") algorithm.

Embodiments of the present disclosure also provide a computer program product for cloud computing security using a quantum encryption algorithm, the computer program product comprising a non-transitory computer-readable medium comprising code causing an apparatus to receive target data from an endpoint device; encrypt the target data using a first encryption algorithm, wherein the first encryption algorithm uses a classical computing process; transmit the target data to a quantum computing system; trigger the quantum computing system to encrypt the target data using a second encryption algorithm, wherein the second encryption algorithm uses a quantum computing process; and transfer the target data to one or more cloud computing hosts.

In some embodiments, the code further causes the apparatus to receive the target data from the one or more cloud computing hosts; trigger the quantum computing system to decrypt the target data using the second encryption algorithm; receive the target data from the quantum computing system; decrypt the target data using the first encryption algorithm; and transmit the target data to one or more requesting endpoint devices.

In some embodiments, transferring the target data to the one or more cloud computing hosts comprises monitoring a status of the one or more cloud computing hosts, wherein the status comprises computing resource consumption, process execution, and machine performance of the one or more cloud computing hosts; and based on characteristics of the target data and the status of the one or more cloud computing hosts, selecting a first cloud computing host among the one or more cloud computing hosts for storing the target data.

In some embodiments, transferring the target data to the one or more computing hosts further comprises detecting that the first cloud computing host is overloaded; retrieve a copy of the target data from one or more registries; trigger the quantum computing system to encrypt the copy of the target data using the second encryption algorithm; and transmit the copy of the target data to a second cloud computing host among the one or more cloud computing hosts.

In some embodiments, the code further causes the apparatus to automatically restart the first cloud computing host in response to detecting that the first cloud computing host is overloaded.

In some embodiments, the first encryption algorithm is a data encryption standard ("DES") algorithm, wherein the second encryption algorithm is a quantum key distribution ("QKD") algorithm.

Embodiments of the present disclosure also provide a computer-implemented method for distributed and authenticated provisioning of encrypted electronic data, the computer-implemented method comprising receiving target data from an endpoint device; encrypting the target data using a first encryption algorithm, wherein the first encryption algorithm uses a classical computing process; transmitting the target data to a quantum computing system; triggering the quantum computing system to encrypt the target data using a second encryption algorithm, wherein the second encryption algorithm uses a quantum computing process; and transferring the target data to one or more cloud computing hosts.

In some embodiments, the computer-implemented method further comprises receiving the target data from the one or more cloud computing hosts; triggering the quantum computing system to decrypt the target data using the second encryption algorithm; receiving the target data from the quantum computing system; decrypting the target data using the first encryption algorithm; and transmitting the target data to one or more requesting endpoint devices.

In some embodiments, transferring the target data to the one or more cloud computing hosts comprises monitoring a status of the one or more cloud computing hosts, wherein the status comprises computing resource consumption, process execution, and machine performance of the one or more cloud computing hosts; and based on characteristics of the target data and the status of the one or more cloud computing hosts, selecting a first cloud computing host among the one or more cloud computing hosts for storing the target data.

In some embodiments, transferring the target data to the one or more computing hosts further comprises detecting that the first cloud computing host is overloaded; retrieve a copy of the target data from one or more registries; trigger the quantum computing system to encrypt the copy of the target data using the second encryption algorithm; and transmit the copy of the target data to a second cloud computing host among the one or more cloud computing hosts.

In some embodiments, the computer-implemented method further comprises automatically restarting the first cloud computing host in response to detecting that the first cloud computing host is overloaded.

In some embodiments, the first encryption algorithm is a data encryption standard ("DES") algorithm.

In some embodiments, the second encryption algorithm is a quantum key distribution ("QKD") algorithm.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
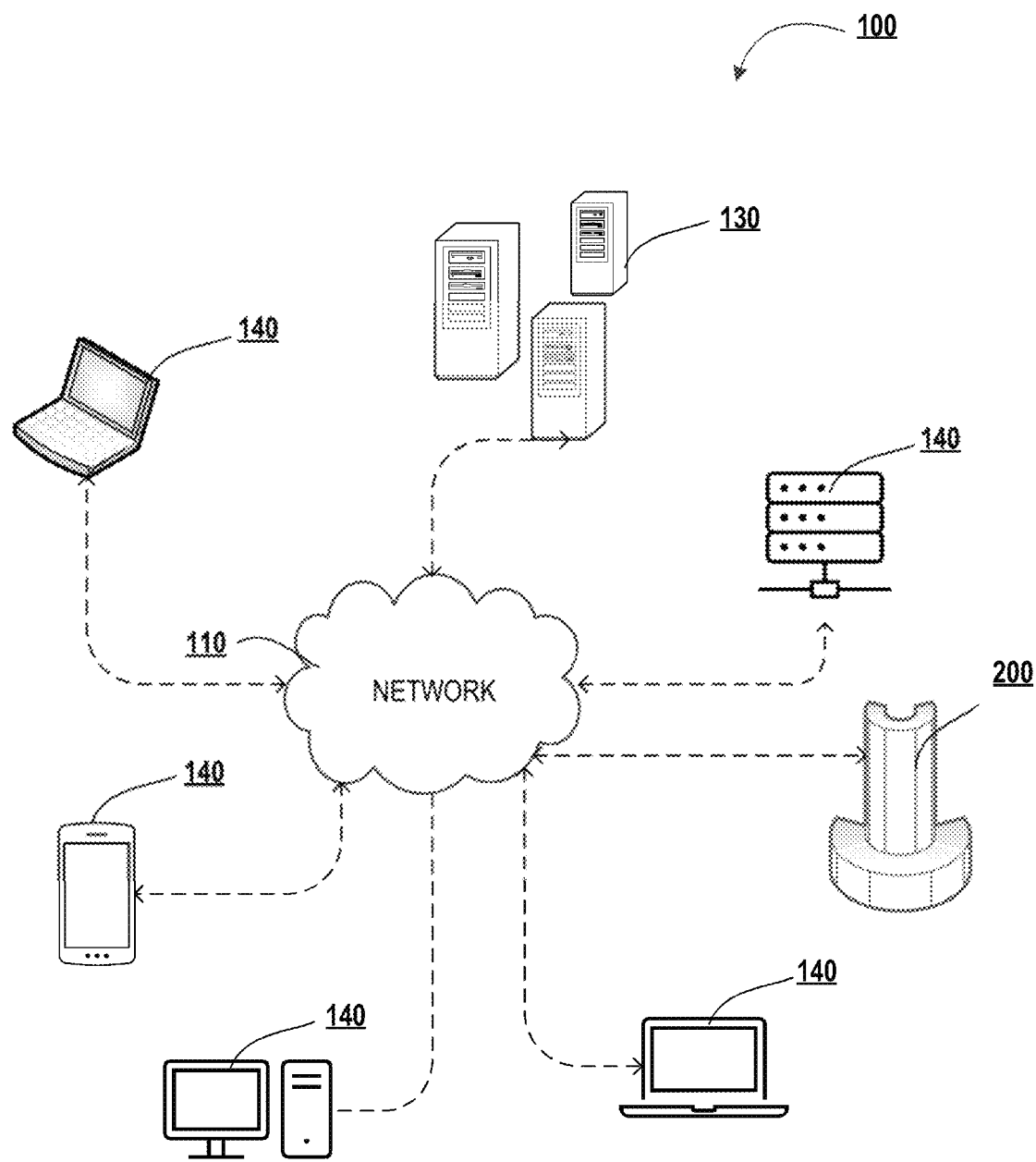
Figure 1B:
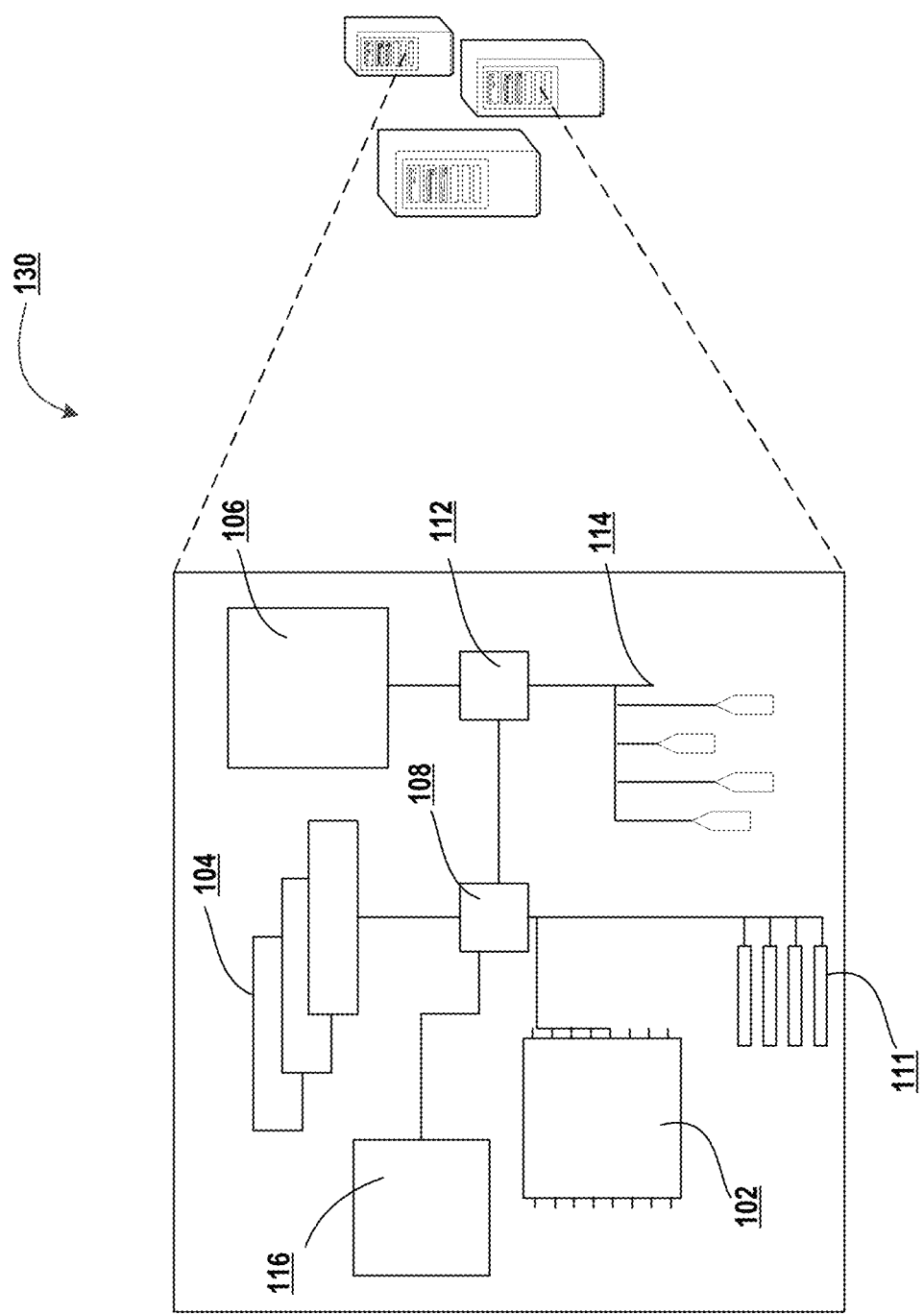
Figure 2:
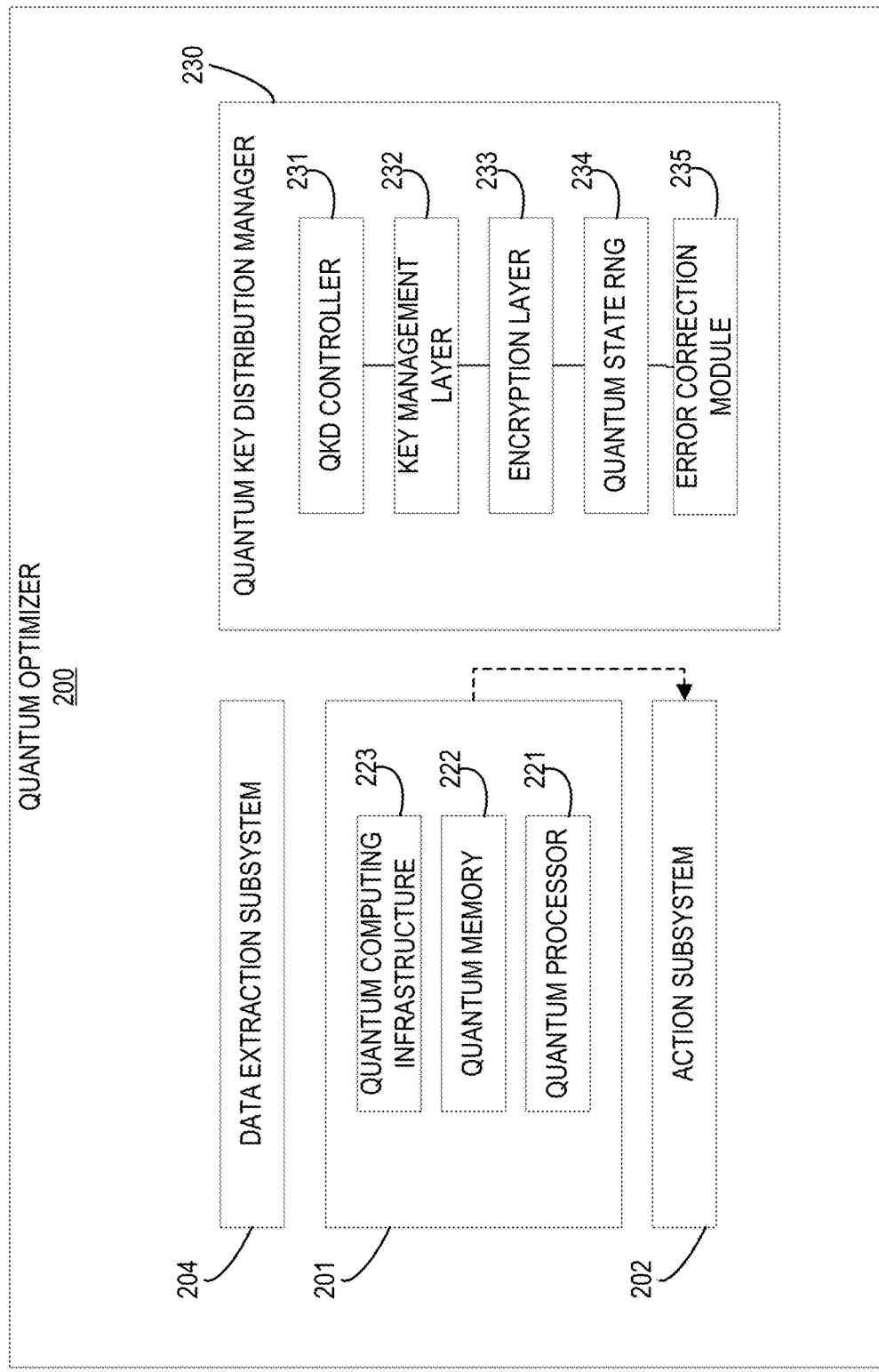
Figure 3:
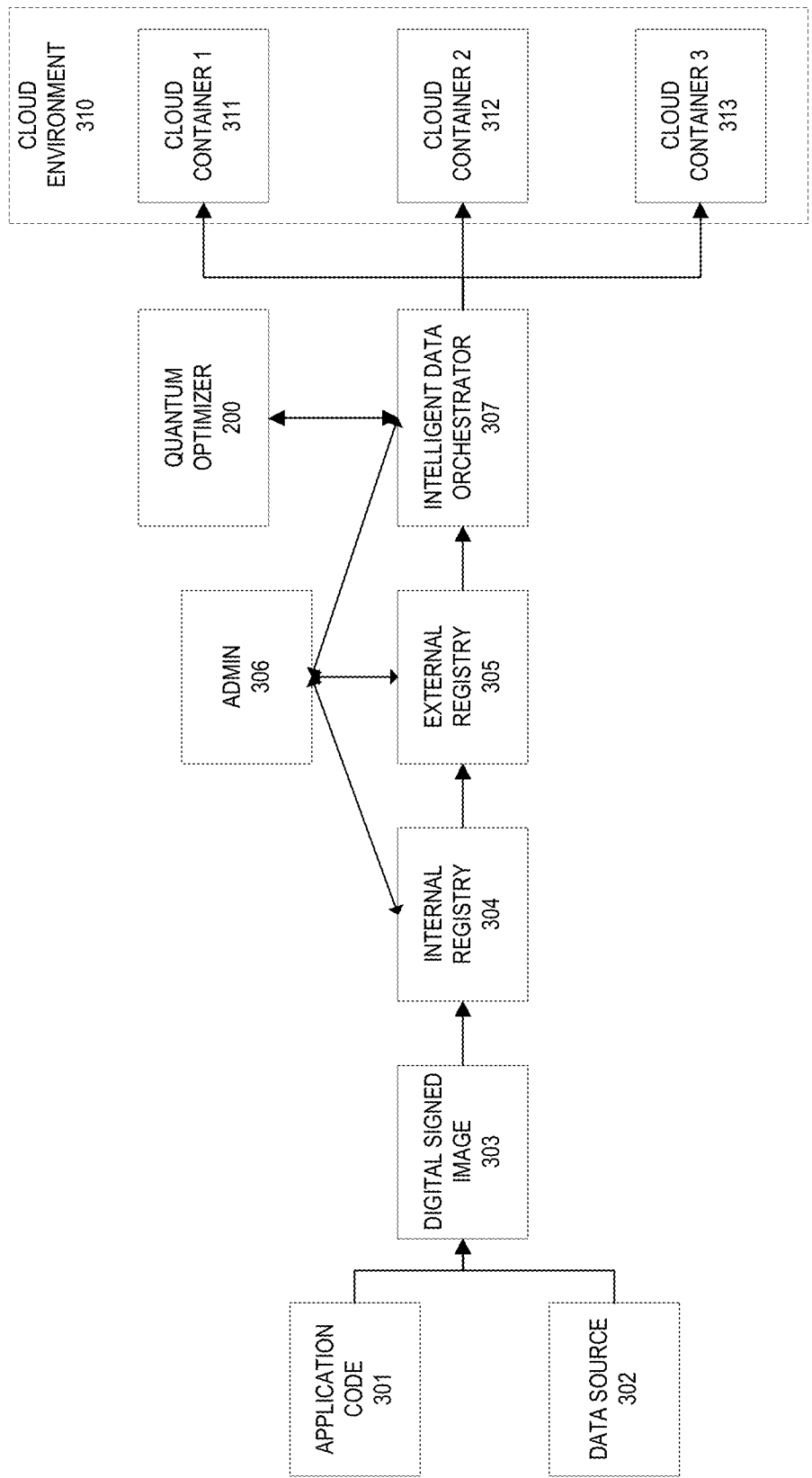
Figure 4:
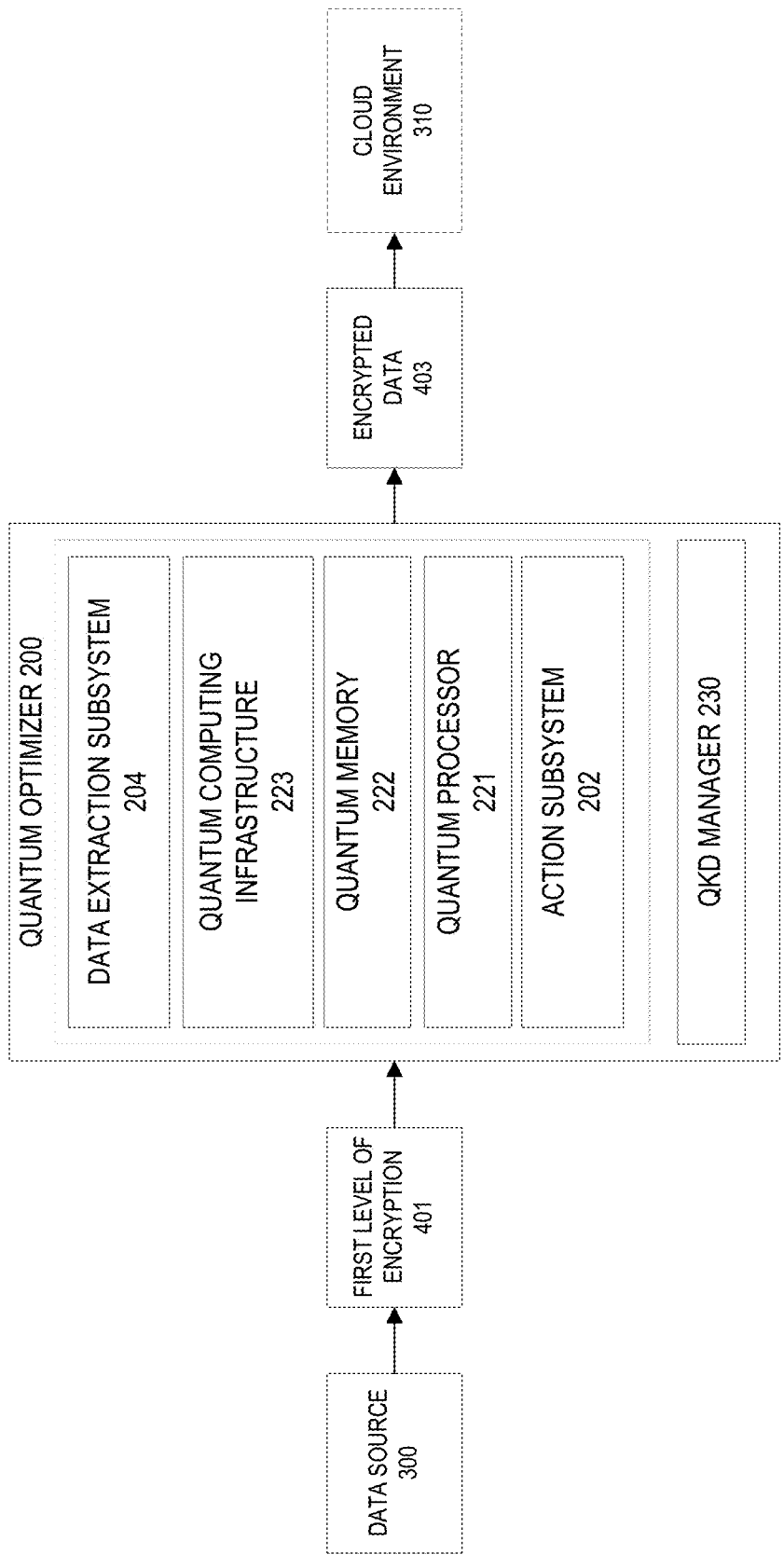
Figure 5:
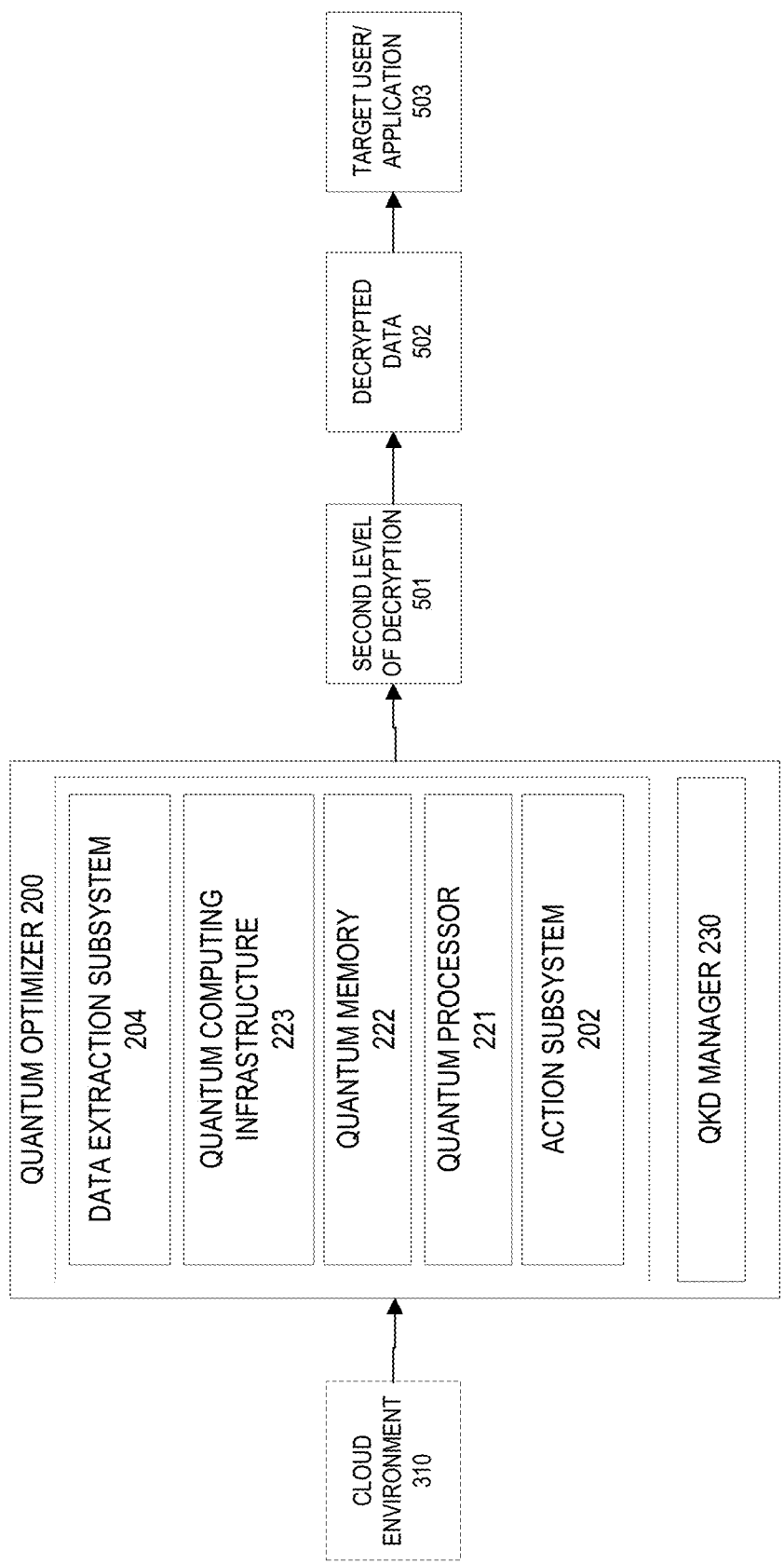
Figure 6:
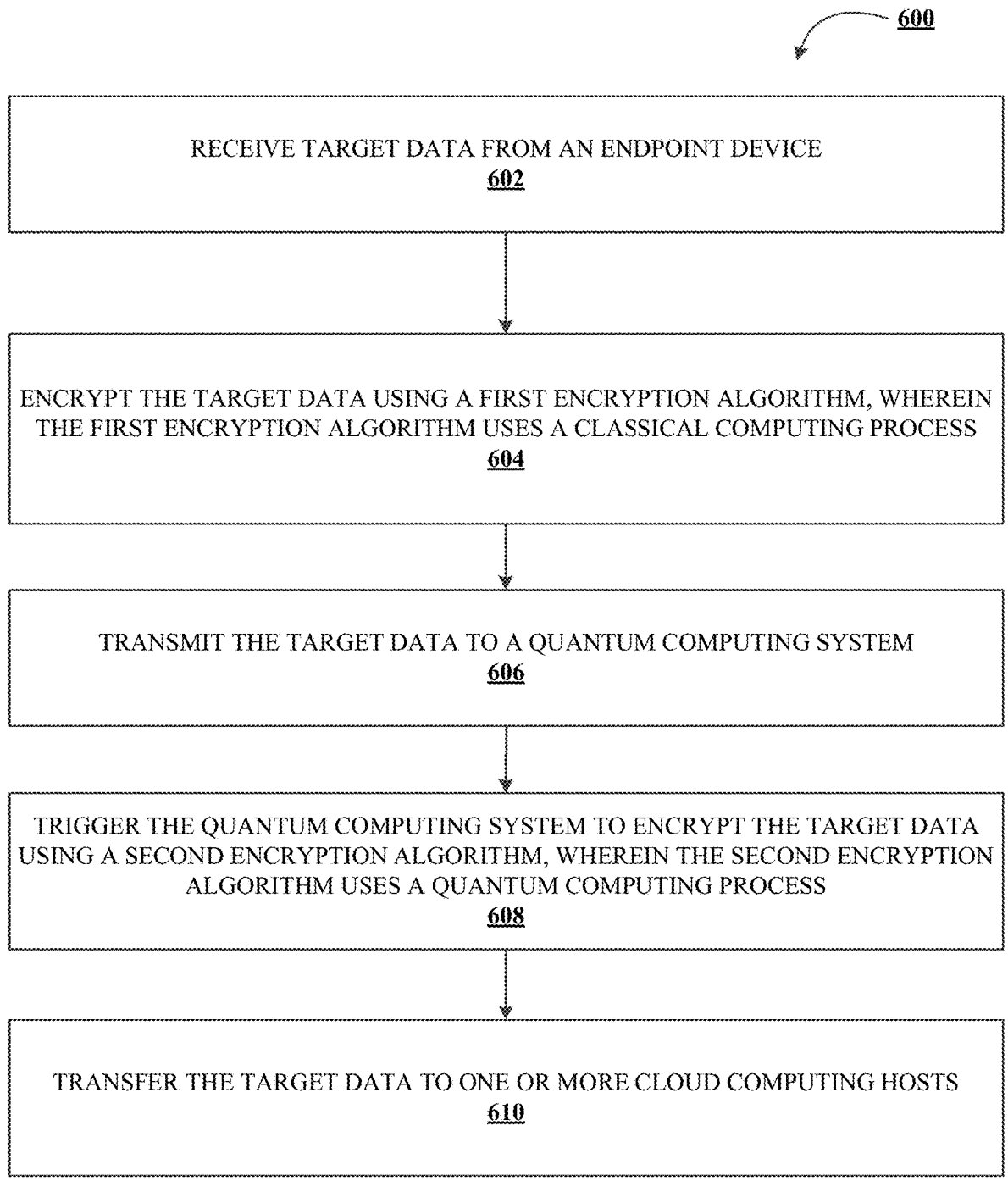
Figure 7:
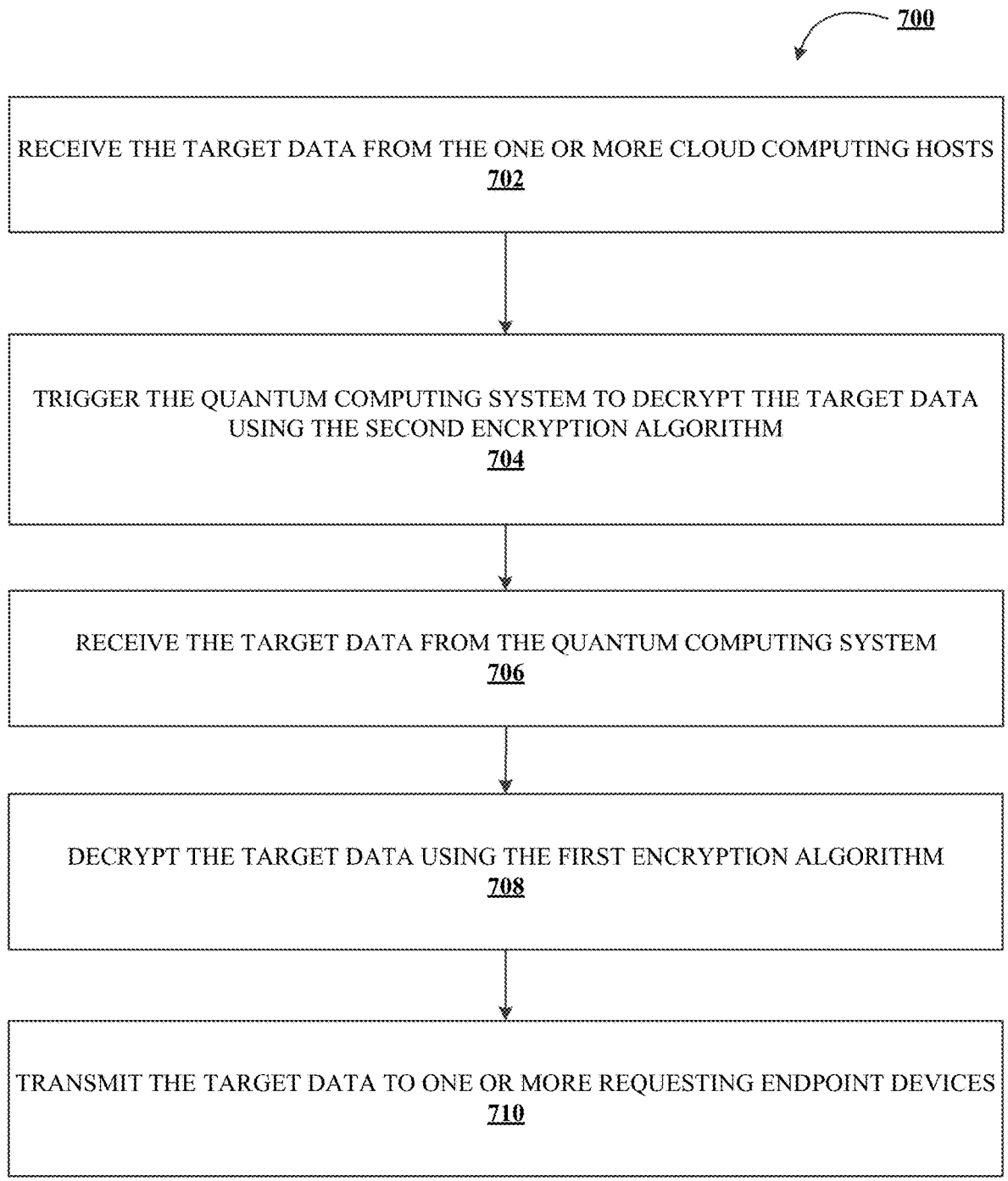

Having thus described embodiments of the invention in general terms, reference will now be made the accompanying drawings, wherein:

FIGS. 1A-1C illustrates technical components of an exemplary distributed computing environment for the system for cloud computing security using a quantum encryption algorithm, in accordance with an embodiment of the present disclosure;

FIG. 2 illustrates a block diagram for an exemplary quantum optimizer, in accordance with an embodiment of the present disclosure;

FIG. 3 illustrates a block diagram illustrating a flow for operation of the intelligent data orchestrator, in accordance with an embodiment of the present disclosure;

FIG. 4 illustrates a block diagram for an overview of the data encryption process, in accordance with an embodiment of the present disclosure;

FIG. 5 illustrates a block diagram for an overview of the data decryption process, in accordance with an embodiment of the present disclosure;

FIG. 6 illustrates a process flow for encrypting target data using the system for cloud computing security using a quantum encryption algorithm, in accordance with an embodiment of the present disclosure; and FIG. 7 illustrates a process flow for decrypting target data using the system for cloud computing security using a quantum encryption algorithm, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface ("GUI") or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, personalized characteristic information (e.g., iris recognition, retina scans, fingerprints, and/or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may generally refer to physical or virtual objects that may be used to accomplish the entity's objectives. In this regard, the resources may include technology related hardware devices (e.g., desktop computers, servers, laptop computers, computer components, routers, hubs, switches, and/or the like), software (e.g., applications, libraries, data files, and/or the like), or computing resources such as processing power, memory allocation, cache space, storage space, data files, network connections and/or bandwidth, electrical power, input/output functions, and the like, or data files (e.g., document files, media files, system files, and/or the like).

As used herein, "quantum computing" or "quantum computing system" may refer to computing processes and/or a computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time.

Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three-qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present disclosure may harness the quantum ability of optimization by utilizing a quantum computer in conjunction with a classical computer. Such a configuration allows the system to benefit from the quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, and 9,207,672, each of which is incorporated herein by reference in its entirety.

In view of the improvements in the availability and speed of network connections between computing systems, entities and organizations may use a cloud computing architecture for their data storage and/or delivery requirements. In using a distributed data storage paradigm, it is desirable to protect data from security vulnerabilities while maintaining or improving the expediency, availability, and reliability of data transfers from the cloud servers to the various endpoint devices within the network environment.

To address the foregoing among other scenarios, embodiments of the present disclosure provide a system for cloud computing security using a quantum encryption algorithm (which may also be referred to herein as "the system" or "intelligent cloud security system"). The system may comprise an intelligent data orchestrator that may coordinate the storage of target data on one or more servers or containers within a cloud server environment as well as the delivery of data stored on cloud servers within the cloud server environment to one or more requesting endpoint devices. In this regard, the intelligent data orchestrator may trigger the encryption of the target data as the target data is moved from the endpoint devices to a cloud server or container, as well as when the target data is moved between servers and/or containers. The intelligent data orchestrator may further trigger the decryption of the target data when the target data is served to the endpoint devices.

The system may receive the set of target data from an endpoint device to be encrypted and stored within the cloud server environment (e.g., in the form of a request transmitted by the endpoint device, where the request comprises the target data to be encrypted). Upon receiving the target data, the system may encrypt the target data using a first encryption algorithm, where the first encryption algorithm may be an algorithm that uses conventional computing processing. Accordingly, in some embodiments, the first encryption algorithm may include a symmetric key algorithm such as the Data Encryption Standard ("DES") algorithm, though it is within the scope of the disclosure for the first encryption algorithm to include other encryption algorithms, such as Advanced Encryption Standard ("AES"), Twofish, or the like. In some embodiments, a digital signature may be added to the target data before the target data is transmitted to one or more registries. "Registry" as used herein may refer to a host or server that temporarily stores the target data until the target data is received by the intelligent data orchestrator.

Once the intelligent data orchestrator receives the target data, which at this stage has been encrypted using the first encryption algorithm, the intelligent data orchestrator may direct the encryption of the target data using a second encryption algorithm, where the second encryption algorithm may be an algorithm that uses quantum processing, such as Quantum Key Distribution ("QKD") algorithm. In this regard, the intelligent data orchestrator may call a quantum optimizer to perform the encryption of the target data using the QKD algorithm. Once the target data has been encrypted with both encryption algorithms, the intelligent data orchestrator may store the target data on one or more servers or containers within the cloud computing environment.

Upon receiving a request to retrieve the target data from the cloud computing environment, the intelligent data orchestrator may receive the target data from the one or more servers or containers and direct the quantum optimizer to perform decryption of the target data using the second encryption algorithm (e.g., the QKD algorithm). The target data may then be decrypted using the first encryption algorithm (e.g., the DES algorithm). The target data, now in its decrypted state, may be transmitted to the requesting endpoint device.

In some embodiments, the intelligent data orchestrator may further perform various additional functions, such as load balancing, monitoring computing resource consumption, job execution, and machine health of the various devices within the system. In this regard, the intelligent data orchestrator may redistribute computing loads from one server or container (e.g., a server that is operating at a computing load that exceeds a predefined threshold) to one or more other servers or containers to maintain the performance of the data storage and/or serving processes. Furthermore, if a particular server or container is experiencing issues (e.g., performance is sluggish, the server has stopped responding, and/or the like), the intelligent data orchestrator may execute one or more remediation processes (e.g., restarting the failed server or container, creating and/or activating one or more backup servers or containers, and/or the like. In scenarios in which data is moved from a first server or container to a second server or container, the intelligent data orchestrator may coordinate the decryption of the data stored on the first server (e.g., the failed or failing server) using the QKD algorithm and re-encrypting the data using the QKD algorithm before storing the encrypted data on the second server or container. In this way, the system may ensure the uptime, availability, and transfer speed of serving data in response to data requests.

The system as described herein provides a number of technological benefits over existing data storage systems. In particular, by using quantum computing to decrypt and encrypt the target data, the system may exponentially increase the speed of the decryption and encryption processes compared to conventional computing systems while simultaneously leveraging the strength of encryption using a quantum algorithm, which makes the encryption high resistant to unauthorized attempts to access the encrypted data. Consequently, the endpoint devices, when using the cloud computing environment, may benefit from increased security of the target data without incurring processing delays in storing or requesting the target data from the cloud servers.

FIGS. 1A-1C illustrate technical components of an exemplary distributed computing environment 100 for the system for cloud computing security using a quantum encryption algorithm. As shown in FIG. 1A, the distributed computing environment 100 contemplated herein may include a cloud computing security system 130, an end-point device(s) 140, and a network 110 over which the cloud computing security system 130 and end-point device(s) 140 communicate therebetween. In some embodiments, the cloud computing security system 130 and/or the endpoint device(s) 140 may be communicatively coupled to a quantum optimizer 200. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to cloud computing security system 130, with each system providing portions of the necessary operations (e.g., as a server bank, a group of blade servers, or a multiprocessor system).

In some embodiments, the cloud computing security system 130, the quantum optimizer 200, and the end-point device(s) 140 may have a client-server relationship in which the end-point device(s) 140 are remote devices that request and receive service from a centralized server, i.e., the cloud computing security system 130. In some other embodiments, the cloud computing security system 130, the quantum optimizer 200, and the end-point device(s) 140 may have a peer-to-peer relationship in which the cloud computing security system 130 and the end-point device(s) 140 are considered equal and all have the same abilities to use the resources available on the network 110. Instead of having a central server (e.g., cloud computing security system 130) which would act as the shared drive, each device that is connect to the network 110 would act as the server for the files stored on it. In some embodiments, the cloud computing security system 130 may provide an application programming interface ("API") layer for communicating with the end-point device(s) 140.

The cloud computing security system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The quantum optimizer 200 may represent a quantum computing system that may be used to execute quantum computing operations. Accordingly, as part of the overall system, the quantum optimizer 200 may perform quantum computations in concert with the conventional computing operations executed by the cloud computing security system 130 and/or the endpoint device(s) 140.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the cloud computing security system 130 may be separated into two or more distinct portions.

FIG. 1B illustrates an exemplary component-level structure of the cloud computing security system 130, in accordance with an embodiment of the invention. As shown in FIG. 1B, the cloud computing security system 130 may include a processor 102, memory 104, input/output (I/O) device 116, and a storage device 110. The cloud computing security system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., cloud computing security system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the cloud computing security system 130 using any subsystems described herein. It is to be understood that the cloud computing security system 130 may use, as appropriate, multiple processors, along with multiple memories, and/or I/O devices, to execute the processes described herein.

The memory 104 stores information within the cloud computing security system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the cloud computing security system 130 during operation.

The storage device 106 is capable of providing mass storage for the cloud computing security system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the cloud computing security system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The cloud computing security system 130 may be implemented in a number of different forms. For example, it may be implemented as a standard server, or multiple times in a group of such servers. Additionally, the cloud computing security system 130 may also be implemented as part of a rack server system or a personal computer such as a laptop computer. Alternatively, components from cloud computing security system 130 may be combined with one or more other same or similar systems and an entire cloud computing security system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the cloud computing security system 130 via the network 110. Any communication between the cloud computing security system 130 and the end-point device(s) 140 may be subject to an authentication protocol allowing the cloud computing security system 130 to maintain security by permitting only authenticated users (or processes) to access the protected resources of the cloud computing security system 130, which may include servers, databases, applications, and/or any of the components described herein. To this end, the cloud computing security system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the cloud computing security system 130 (or other client devices) permissioned access to the protected resources of the end-point device(s) 140, which may include a GPS device, an image capturing component (e.g., camera), a microphone, and/or a speaker.

The end-point device(s) 140 may communicate with the cloud computing security system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the cloud computing security system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the cloud computing security system 130.

Various implementations of the distributed computing environment 100, including the cloud computing security system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 is a schematic diagram of an exemplary quantum optimizer 200, in accordance with one embodiment of the invention. It is understood that quantum optimizer 200 can be used in parallel with a classical computer to solve optimization problems. The quantum optimizer 200 is comprised of a data extraction subsystem 204, a quantum computing subsystem 201, and an action subsystem 205. As used herein, the term "subsystem" generally refers to components, modules, hardware, software, communication links, and the like of particular components of the system. Subsystems as contemplated in embodiments of the present invention are configured to perform tasks within the system as a whole.

The data extraction subsystem 204 communicates with the cloud computing security system 130 to extract data for optimization. It will be understood that any method of communication between the data extraction subsystem 204 and the network 101 includes, but is not limited to wired communication, Radiofrequency (RF) communication, Bluetooth®, Wi-Fi, and the like. The data extraction subsystem 204 then formats the data for optimization in the quantum computing subsystem, such as converting data into qubits.

The quantum computing subsystem 201 may comprise a quantum computing infrastructure 223, a quantum memory 222, and a quantum processor 221. The quantum computing infrastructure 223 comprises physical components for housing the quantum processor 221 and the quantum memory 222. The quantum computer infrastructure 223 further comprises a cryogenic refrigeration system to keep the quantum computing subsystem 201 at the desired operating conditions. In general, the quantum processor 221 is designed to perform adiabatic quantum computation and/or quantum annealing to optimize data received from the data extraction subsystem 204. The quantum memory 222 is comprised of a plurality of qubits used for storing data during operation of the quantum computing subsystem 201. In general, qubits are any two-state quantum mechanical system. It will be understood that the quantum memory 222 may be comprised of any such two-state quantum mechanical system, such as the polarization of a single photon, the spin of an electron, and the like.

The action subsystem 202 communicates the optimized data from the quantum computing subsystem 201 back to the data monitoring system 106. It will be understood that any method of communication between the data extraction subsystem 204 and the network 101 includes, but is not limited to wired communication, Radiofrequency (RF) communication, Bluetooth, Wi-Fi, and the like.

The quantum optimizer 200 may further comprise a quantum key distribution manager 230 that controls the encryption of the target data using the QKD algorithm. In particular, the quantum key distribution manager 230 may comprise one or more hardware and/or software components, which may include a QKD controller 231, a key management layer 232, an encryption layer 233, and a quantum state random number generator ("QSRNG") 234. The QKD controller 231 may control and/or orchestrate the encryption of the target data (e.g., by communicating with the intelligent data orchestrator over a network). The encryption layer 233 performs the quantum algorithm-based encryption of the target data by receiving two random digital sequences (e.g., $RSA_1$ and $RSA_2$) from the QSRNG 234. Based on the two random sequences, the encryption layer 233 may generate a random string of qubits that may then be used to encrypt the target data. The key management layer 232 may exist between the QKD controller 231 and the encryption layer 233 to perform de-multiplexing of bits such that the target data may be accessed and used by the various endpoint devices and/or the applications associated therewith. In some embodiments, the quantum key distribution manager 230 may further comprise an error correction module 235 that may perform an error correction process to remove errors and/or data leakage that may occur during the encryption process.

In accordance with the present systems and methods, an on-board quantum optimizer may be employed to perform encryption and decryption functions quickly and more reliably than a classical digital computing system. Because a quantum computing device inherently performs optimization in its natural evolution, quantum optimizer is particularly well-suited to solve optimization problems and process large swaths of incoming real-time data (e.g., the target data received from the endpoint devices).

FIG. 3 illustrates a block diagram illustrating a flow for operation of the intelligent data orchestrator, in accordance with an embodiment of the present disclosure. The system may intake the target data from application code 301 and/or a data source 302 (e.g., a user or user computing device). A digital signature may be added to the target data received from the application code 301 and/or the data source 302 to generate a digital signed image 303. The digital signed image 303 may then be pushed to and stored on an internal registry 304 and/or an external registry 305. The intelligent data orchestrator 307 may coordinate the movement of the target data between the inputs (e.g., the application code 301 and/or the data source 302), the registries 304, 305, the quantum optimizer 200, and one or more cloud containers 311, 312, 313 within a cloud environment 310. In some embodiments, an administrator 306 may access the registries 304, 305 and/or the intelligent data orchestrator 307 to further configure the settings of the intelligent data orchestrator 307.

FIG. 4 illustrates a block diagram for an overview of the data encryption process, in accordance with an embodiment of the present disclosure. A more detailed description of the process may be found elsewhere herein, such as the description accompanying FIG. 6. The process may begin by receiving the target data from the data source 300. The target data may undergo a first level of encryption 401, wherein the target data may be encrypted using a first encryption algorithm that may use classical computing. In this regard, the first encryption algorithm may be a DES algorithm. The target data may then be passed to the quantum optimizer 200, which may cause the target data to be encrypted to a second level of encryption. In this regard, the quantum optimizer 200 may encrypt the target data using a second encryption algorithm that may use quantum processing (e.g., a QKD algorithm). The encrypted data 403 (which has been encrypted to a first level and second level) may then be provided to the cloud environment 310 for storage across one or more servers or containers within the cloud environment 310.

FIG. 5 illustrates a block diagram for an overview of the data decryption process, in accordance with an embodiment of the present disclosure. A more detailed description of the process may be found elsewhere herein, such as the description accompanying FIG. 7. Upon request by a target user and/or application 503, the system may retrieve the requested target data from the cloud environment 310 and perform a first level of decryption on the target data using the quantum optimizer 200. In this regard, the first level of decryption may be executed using the second encryption algorithm (e.g., the QKD algorithm). The system may then perform a second level of decryption 501 on the target data, where the second level of decryption 501 may be performed using the first encryption algorithm (e.g., the DES algorithm). Once the target data has been decrypted using both encryption algorithms (e.g., the quantum algorithm and the classical algorithm), the decrypted data 502 may be provided to the target user or application 503.

FIG. 6 illustrates a process flow 600 for encrypting target data using the system for cloud computing security using a quantum encryption algorithm, in accordance with an embodiment of the present disclosure. The process begins at block 602, where the system receives target data from an endpoint device. In some embodiments, the target data may be a set of data that the user of the endpoint device has requested to be stored on a cloud server. In other embodiments, the target data may be data that is used by an application installed on the endpoint device which may request the target data to be stored on the cloud server. Accordingly, the target data may include various types of data, such as document files, application and/or system files, media files, executables, archives, and/or the like. It should be appreciated that the processes described herein may be executed in such a way that the encryption and/or decryption of the target data is invisible or seamless to the user of the endpoint device and/or the endpoint device itself. In an exemplary embodiment, an application installed on the endpoint device may store its application data files on the cloud server. Accordingly, the endpoint device may submit a request to store the target data (e.g., the application data files) on the cloud server.

The process continues to block 604, where the system encrypts the target data using a first encryption algorithm, wherein the first encryption algorithm uses a classical computing process. In some embodiments, the first encryption algorithm may be a symmetric key algorithm such as DES algorithm, though it is within the scope of the disclosure for the algorithm to be another type of symmetric key algorithm (e.g., Twofish). Accordingly, the first round of encryption may be executed using classical computing. In some embodiments, the system may then store the encrypted target data within one or more internal and/or external registries temporarily for the purpose of making the target data available to the intelligent data orchestrator.

The process continues to block 606, where the system transmits the target data to a quantum computing system. The system may communicate with the quantum computing system over the network (e.g., by communicating with the QKD controller of the quantum computing system through an application programming interface, or "API"). Accordingly, the target data, which at this stage has been encrypted using the first encryption algorithm, may be transmitted to the quantum computing system for quantum processing.

The process continues to block 608, where the system triggers the quantum computing system to encrypt the target data using a second encryption algorithm, wherein the second encryption algorithm uses a quantum computing process. The API layer may be configured to receive various different commands or functions from the intelligent data orchestrator at the quantum computing system, which may include a function to initiate the quantum encryption process and return the target data in its doubly encrypted form. Accordingly, in some embodiments, the second encryption algorithm may be a QKD algorithm.

The process continues to block 610, where the system transfers the target data to one or more cloud computing hosts. The one or more cloud computing hosts may include servers or containers that may be used to store the target data once the target data has been encrypted using the first encryption algorithm and the second encryption algorithm. In some embodiments, the intelligent data orchestrator may be configured to intelligently select a cloud computing host based on the characteristics of the target data (e.g., the intended use or purpose of the target data) and of the cloud computing host. For instance, the system may determine that the target data is application data that may be sensitive to network congestion or latency. Accordingly, the intelligent data orchestrator may select a cloud computing host based on processing performance, availability of system resources, network bandwidth, system uptime, and/or the like.

In some embodiments, the intelligent data orchestrator may further be configured to perform intelligent load balancing and/or failover for the one or more cloud computing hosts. In this regard, the system may monitor statuses of the one or more cloud computing hosts, where the statuses may include computing resource consumption, process execution, and machine operations (e.g., whether the host is performing according to specifications). For instance, the system may detect that, based on monitoring a particular host, that the host is overloaded (e.g., the host lacks processing power and/or network bandwidth). In such an embodiment, the system may retrieve the target data from the underperforming host, trigger the quantum computing system to decrypt the target data using the second encryption algorithm, then re-encrypt the target data using the second encryption algorithm, and transmit the target data to a second host with acceptable performance metrics and/or levels of computing resource consumption. In other embodiments, the system may access a copy of the target data from the one or more registries on which the target data is stored, encrypt the copy of the target data using the second encryption algorithm, and transmit the copy of the target data to a second cloud computing host. By re-encrypting the target data when moving the target data between hosts, the system may provide additional security for the target data during the transition process while maximizing uptime and availability of the target data.

FIG. 7 illustrates a process flow 700 for decrypting target data using the system for cloud computing security using a quantum encryption algorithm, in accordance with an embodiment of the present disclosure. The process begins at block 702, where the system receives the target data from the one or more cloud computing hosts. In this regard, the system may communicate with the one or more cloud computing hosts which store the target data to retrieve the target data from the one or more cloud computing hosts.

The process continues to block 704, where the system triggers the quantum computing system to decrypt the target data using the second encryption algorithm. In particular, the system may input the encrypted target data into the quantum computing system such that once the quantum computing system has decrypted the target data using the QKD algorithm, the quantum computing system may output the target data for further processing.

The process continues to block 706, where the system receives the target data from the quantum computing system. It should be noted that at this stage, the target data is still encrypted by the first encryption algorithm.

The process continues to block 708, where the system decrypts the target data using the first encryption algorithm. Finally, the process continues to block 710, where the system transmits the target data to one or more requesting endpoint devices. Continuing the above example, the decrypted target data may be made available to the application installed on the endpoint device to drive the processes of the application. By combining quantum computing with cloud computing technology, the system may provide a secure and expedient way to store and serve data to the various devices within the network.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for cloud computing security using a quantum encryption algorithm, the system comprising:
at least one non-transitory storage device; and
at least one processor coupled to the at least one non-transitory storage device, wherein the at least one processor is configured to:
receive target data from an endpoint device;
encrypt the target data using a first encryption algorithm, wherein the first encryption algorithm uses a classical computing process;
transmit the target data to a quantum computing system;
trigger the quantum computing system to encrypt the target data using a second encryption algorithm, wherein the second encryption algorithm uses a quantum computing process;
transfer the target data to one or more cloud computing hosts;
monitor a status of the one or more cloud computing hosts associated with the transfer of the target data, wherein the status comprises computing resource consumption, process execution, and machine performance of the one or more cloud computing hosts;
based on characteristics of the target data and the status of the one or more cloud computing hosts, select a first cloud computing host among the one or more cloud computing hosts for storing the target data;
detect that the first cloud computing host is overloaded;
retrieve a copy of the target data from one or more registries;
trigger the quantum computing system to encrypt the copy of the target data using the second encryption algorithm; and
transmit the copy of the target data to a second cloud computing host among the one or more cloud computing hosts.

2. The system of claim 1, wherein the at least one processor is further configured to:
receive the target data from the one or more cloud computing hosts;
trigger the quantum computing system to decrypt the target data using the second encryption algorithm;
receive the target data from the quantum computing system;
decrypt the target data using the first encryption algorithm; and
transmit the target data to one or more requesting endpoint devices.

3. The system of claim 1, wherein the at least one processor is further configured to automatically restart the first cloud computing host in response to detecting that the first cloud computing host is overloaded.

4. The system of claim 1, wherein the first encryption algorithm is a data encryption standard ("DES") algorithm.

5. The system of claim 1, wherein the second encryption algorithm is a quantum key distribution ("QKD") algorithm.

6. A computer program product for cloud computing security using a quantum encryption algorithm, the computer program product comprising a non-transitory computer-readable medium comprising code causing an apparatus to:
receive target data from an endpoint device;
encrypt the target data using a first encryption algorithm, wherein the first encryption algorithm uses a classical computing process;
transmit the target data to a quantum computing system;

trigger the quantum computing system to encrypt the target data using a second encryption algorithm, wherein the second encryption algorithm uses a quantum computing process;

transfer the target data to one or more cloud computing hosts;

monitor a status of the one or more cloud computing hosts associated with the transfer of the target data, wherein the status comprises computing resource consumption, process execution, and machine performance of the one or more cloud computing hosts;

based on characteristics of the target data and the status of the one or more cloud computing hosts, select a first cloud computing host among the one or more cloud computing hosts for storing the target data;

detect that the first cloud computing host is overloaded;

retrieve a copy of the target data from one or more registries;

trigger the quantum computing system to encrypt the copy of the target data using the second encryption algorithm; and transmit the copy of the target data to a second cloud computing host among the one or more cloud computing hosts.

7. The computer program product of claim 6, wherein the code further causes the apparatus to:

receive the target data from the one or more cloud computing hosts;

trigger the quantum computing system to decrypt the target data using the second encryption algorithm;

receive the target data from the quantum computing system;

decrypt the target data using the first encryption algorithm; and transmit the target data to one or more requesting endpoint devices.

8. The computer program product of claim 6, wherein the code further causes the apparatus to automatically restart the first cloud computing host in response to detecting that the first cloud computing host is overloaded.

9. The computer program product of claim 6, wherein the first encryption algorithm is a data encryption standard ("DES") algorithm, wherein the second encryption algorithm is a quantum key distribution ("QKD") algorithm.

10. A computer-implemented method for distributed and authenticated provisioning of encrypted electronic data, the computer-implemented method comprising:

receiving target data from an endpoint device;

encrypting the target data using a first encryption algorithm, wherein the first encryption algorithm uses a classical computing process;

transmitting the target data to a quantum computing system;

triggering the quantum computing system to encrypt the target data using a second encryption algorithm, wherein the second encryption algorithm uses a quantum computing process;

transferring the target data to one or more cloud computing hosts;

monitoring a status of the one or more cloud computing hosts associated with the transfer of the target data, wherein the status comprises computing resource consumption, process execution, and machine performance of the one or more cloud computing hosts;

based on characteristics of the target data and the status of the one or more cloud computing hosts, selecting a first cloud computing host among the one or more cloud computing hosts for storing the target data;

detecting that the first cloud computing host is overloaded;

retrieving a copy of the target data from one or more registries;

triggering the quantum computing system to encrypt the copy of the target data using the second encryption algorithm; and transmitting the copy of the target data to a second cloud computing host among the one or more cloud computing hosts.

11. The computer-implemented method of claim 10, wherein the computer-implemented method further comprises:

receiving the target data from the one or more cloud computing hosts;

triggering the quantum computing system to decrypt the target data using the second encryption algorithm;

receiving the target data from the quantum computing system;

decrypting the target data using the first encryption algorithm; and transmitting the target data to one or more requesting endpoint devices.

12. The computer-implemented method of claim 10, wherein the computer-implemented method further comprises automatically restarting the first cloud computing host in response to detecting that the first cloud computing host is overloaded.

13. The computer-implemented method of claim 10, wherein the first encryption algorithm is a data encryption standard ("DES") algorithm.

14. The computer-implemented method of claim 10, wherein the second encryption algorithm is a quantum key distribution ("QKD") algorithm.

* * * * *